United States Patent
Hsiung et al.

(10) Patent No.: US 6,352,676 B1
(45) Date of Patent: Mar. 5, 2002

(54) ABATEMENT OF $F_2$ USING SMALL PARTICLE FLUIDIZED BED

(75) Inventors: Thomas Hsiao-Ling Hsiung, Emmaus; Howard Paul Withers, Jr., Breinigsville, both of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/251,083

(22) Filed: Feb. 16, 1999

(51) Int. Cl.$^7$ .............................................. B01D 53/68
(52) U.S. Cl. ............... 423/240 R; 423/241; 423/240 S; 423/493
(58) Field of Search ................... 423/240 R, 240 S, 423/241, 239, 493

(56) References Cited

U.S. PATENT DOCUMENTS

| | | | | |
|---|---|---|---|---|
| 4,485,081 A | * | 11/1984 | Magistro | 423/481 |
| 5,094,825 A | * | 3/1992 | Mori | 423/240 R |
| 5,380,507 A | * | 1/1995 | Hiltunen et al. | 423/240 S |
| 5,417,948 A | | 5/1995 | Iwata et al. | 423/239 |
| 5,500,195 A | * | 3/1996 | Garcia-Mallol | 423/240 R |
| 5,589,148 A | * | 12/1996 | Otsuka et al. | 423/240 S |
| 5,597,540 A | * | 1/1997 | Akita et al. | 423/241 |
| 5,879,646 A | * | 3/1999 | Orihara et al. | 423/239.1 |
| 5,935,540 A | * | 8/1999 | Otsuka et al. | 423/239.1 |
| 6,106,790 A | * | 8/2000 | Hsiung et al. | 423/239.1 |

FOREIGN PATENT DOCUMENTS

EP   0 898 999   * 3/1999

OTHER PUBLICATIONS

Holmes, et al., Fluidized Bed Disposal of Fluorine, I & EC Process Design and Development, vol. 6, No. 4, Oct. 1967, pp. 408–413.

Netzer, W. D., Fluorine Disposal Processes for Nuclear Applications, Goodyear Atomic Corp., Apr. 8, 1977.

* cited by examiner

Primary Examiner—Ngoc-Yen Nguyen
(74) Attorney, Agent, or Firm—Geoffrey L. Chase

(57) ABSTRACT

A process for destroying fluorine in a gas containing such fluorine by contacting the gas with a fluidized bed of metal particles capable of reacting with such fluorine wherein the metal particles have a particle size essentially no greater than approximately 300 microns. The process can be conducted in parallel connected switching fluidized beds wherein the beds are switched based upon achieving a predetermined bed height expansion based upon the reaction of the metal particles with such fluorine.

12 Claims, No Drawings

ABATEMENT OF $F_2$ USING SMALL PARTICLE FLUIDIZED BED

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

In the process of making semiconductor chips, the exhaust streams of some tools may contain $F_2$. For example, a new tool from Applied Materials uses microwave to dissociate $NF_3$ to clean a reactor chamber. Although the exhaust stream contains only traces of $NF_3$, significant quantities of $F_2$ exist. Streams, such as the exhaust from the Applied Materials tool, have to be treated to remove $F_2$ before venting to the atmosphere. Fluorine is a corrosive and toxic chemical with a TLV of 1 ppm.

Conventionally, $F_2$ is removed using wet caustic scrubbers where $F_2$ reacts with the caustic solution to form fluoride salt. The wet scrubber, although efficient, produces large quantities of liquid wastes that need to be treated later. In addition, the caustic scrubbers can generates toxic byproducts, $OF_2$ and $NO_3F$, that causes additional safety concerns.

Alternatively, $F_2$ has been removed using solids. A packed bed of charcoal has been used to remove $F_2$, but it generates global warming carbon-fluorine gases. Safety is another concern in using carbon, as the possibility exists of forming explosive $CF_x$ compounds in the packed bed. Packed beds of soda lime ($NaOH/Ca(OH)_2$), limestone ($CaCO_3$), and alumina ($Al_2O_3$) have been employed to remove $F_2$. These dry scrubbers frequently plug and require considerable manpower to empty and refill the reactors. In addition, the heat generation inside a packed bed could present a problem when $F_2$ concentration in the feed becomes too high, as the heat removal inside a packed bed is a challenge. Other methods of $F_2$ disposal can be found in the report by Netzer, W. D., Fluorine Disposal Processes for Nuclear Applications, Goodyear Atomic Corp., Apr. 8, 1977.

Holmes, et. al., Fluidized Bed Disposal of Fluorine, I & EC Process Design and Development, Vol. 6, No. 4, October 1967, pp. 408–413, describes the abatement of fluorine using a fluidized bed of activated alumina. High $F_2$ removal efficiency (>99%) was easily achieved at a reaction temperature between 300 to 400° C. The flow rate was limited to 1.25 to 1.65 minimum fluidization velocity. The definition of minimum fluidization velocity can be found in many textbooks, e.g. "Fluidization Engineering" by Kunii and Levenspiel, John Wiley & Sons, 1969. In this velocity range, the fluidized bed is considered at a "bubbling" fluidization mode. Soda ash was also found to be effective.

U.S. Pat. No. 5,417,948 discloses the use of zirconium alloys to abate $NF_3$. It lists fluidized beds as a possible means of contacting the alloys with $NF_3$. A control example used iron wire cut into 5 to 10 mm pieces as a bed material.

The prior art has attempted to provide various methods and means of abating fluorine. However, the prior art has not achieved a commercially viable process for fluorine abatement which generates no pollutants, allows for high throughput, avoidance of clogging, efficient destruction of fluorine and a method for recharging of the abatement system for continuous processing. These advantages are achieved by the present invention, as will be set forth in greater detail below.

BRIEF SUMMARY OF THE INVENTION

The present invention is a process of destroying a fluorine specie selected from the group consisting of fluorine, chlorine trifluoride and mixtures thereof from a gas mixture containing a fluorine specie by contacting the gas with a fluidized bed of metal particles capable of reacting with a fluorine specie wherein the particles have a particle size essentially no greater than approximately 300 microns.

Preferably, up to 10 wt. % of the bed of metal particles are large particles having a particle size sufficiently larger than 300 microns to assist in mixing of the bed of metal particles.

Preferably, the large particles have a particle size of approximately 500 to 2000 microns.

Preferably, the metal particles are selected from the group consisting of iron, nickel, copper, calcium, aluminum, magnesium, manganese, cobalt, zinc, tin and mixtures thereof.

Preferably, the contacting is performed at a temperature in the range of 150 to 550° C.

Preferably, the gas is contacted with the fluidized bed until the height of the fluidized bed increases due to reaction with the fluorine to a predetermined increased bed height.

Preferably, the gas alternately contacts one of at least two parallel switching fluidized beds where one bed is contacting the gas while one or more other fluidized beds are being recharged.

Preferably, the gas contact is switched from a first of at least two parallel switching fluidized beds to an other fluidized bed that has been recharged when the first bed has expanded to at least approximately 90 percent of the original bed height.

Preferably, after the gas contacts the fluidized bed the gas contains no greater than 1 part per million by volume of fluorine specie.

Preferably, the flow of the gas is sufficient to obtain at least a minimum fluidization velocity of the fluidized bed for the metal particles contained in the fluidized bed.

Preferably, the gas has a residence time, defined by the ratio of packed bed volume to the volumetric feed flowrate at normal conditions, in the fluidized bed of greater than approximately 3 seconds.

Preferably, the flow of the gas is approximately at least two times the minimum fluidization velocity.

Preferably, the gas contains a gas component selected from the group consisting essentially of $N_2$, $O_2$, Ar, He, $SiF_4$, $NF_3$, $CF_4$, $C_2F_6$, $CHF_3$, $SF_6$ and mixtures thereof.

Most preferably, the present invention is a process of destroying fluorine in a gas containing fluorine and one or more gas components of $N_2$, $O_2$, Ar, He, $SiF_4$, $NF_3$, $CF_4$, $C_2F_6$, $CHF_3$, $SF_6$, and mixtures thereof by contacting said gas alternately with one of a pair of switching parallel connected fluidized beds of iron metal particles capable of reacting with fluorine wherein the particles have a particle size essentially no greater than approximately 300 microns, and switching beds when the height of the bed being contacted with said gas increases to a predetermined bed height corresponding to substantially stoichiometric reaction of fluorine with the iron metal particles.

Preferably, the iron metal particles are at least approximately 99% iron by weight.

Preferably, the iron metal particles have an average particle size of approximately 100 microns.

Preferably, the iron metal particles react with the fluorine to generate a mixture of $FeF_2$ and $FeF_3$.

In one preferred embodiment, the gas containing fluorine contains predominantly nitrogen and such fluorine.

In an alternate embodiment, the metal particles are continuously being added to the fluidized bed and metal particles that have been reacted with the fluorine are continuously being removed. In this alternate embodiment, preferably a single fluidized bed is utilized.

BRIEF DESCRIPTION OF THE SEVERAL VIEWS OF THE DRAWINGS

Not Applicable

DETAILED DESCRIPTION OF THE INVENTION

The present invention is a method of destroying a fluorine specie of fluorine and/or chlorine trifluoride using fine metal powder in a fluidized bed reactor. The preferred metal powder is iron and should have a purity of greater than 90%, preferably 99% by weight and a particle size essentially no greater than approximately 300 microns, preferably an average particle size of approximately 100 microns. Preferably, up to 10 wt. % of the particles in the bed can be larger than 300 microns with sufficient size to assist in mixing of the particles of essentially no greater than approximately 300 microns during operation and fluidization to prevent caking of the latter particles. These larger particles could preferably have a size of 500 to 2000 microns.

The preferred operating conditions are:

temperature; 150° C. to 550° C.;

feed flow; greater than the minimum fluidization velocity of the powder;

residence time; greater than 3 seconds.

Other metals such as Ni, Cu, Ca, Al, Mg, Mn, Co, Zn and Sn that can form nonvolatile metal fluorides will also be good candidates. The reaction conditions, however, will vary depending on the metal of choice.

The objective of this invention is to provide a cost-effective method of destroying fluorine, $F_2$. Fluorine is a toxic and corrosive chemical with a threshhold limit value (TLV) of 1 ppm. Wet scrubbing with a caustic solution is not effective. Dry scrubbing using packed beds of soda ash, limestone, or alumina has bed clogging problems. The present abatement method provides a simple alternative to fluorine abatement techniques of the prior art, while producing no hazardous waste.

The present invention suggests a method of destroying fluorine in a fluidized bed of preferably fine iron powder. More specifically, a powder with high purity (>99 wt. %) prepared, for example, electrolytically with a particle size of essentially no greater than approximately 300 microns can be used for this application. The high purity iron powder, which is commercially available at a reasonable cost, minimizes the generation of other impurities. The small particle size provides adequate fluidization of the iron-bed and rate of reaction between the iron and the fluorine specie.

The presumed reactions between Fe and $F_2$ are:

$$2Fe + 3F_2 \rightarrow 2FeF_3 \quad (1)$$

$$Fe + F_2 \rightarrow FeF_2 \quad (2)$$

Theoretically, each mole of Fe (56 grams) is capable of removing 38 grams or 57 grams of $F_2$ depending on whether the products are $FeF_2$ or $FeF_3$. No $NO_x$ is formed. Other metals, such as Ni, Cu, Ca, Al, Mg, Mn, Co, Zn and Sn and their alloys that can form nonvolatile metal fluorides, will also be good candidates. The reaction conditions, however, will vary depending on the metal of choice.

Operating conditions will depend on feed composition and flowrate. The fresh iron powder can start to react with fluorine at a temperature as low as 150° C. The method works practically under any operating pressure. Conveniently, an exit pressure close to atmospheric or under slight vacuum will be adequate. Depending on the feed concentration, operating pressure and residence time, the reactor temperature can be chosen to remove fluorine completely. The velocity flowing through the reactor should be high enough to fluidize the solid powder. The fluidization velocity can be measured by plotting pressure drop across the bed versus flow as described in "Fluidization Engineering" by Kunii and Levenspiel and published by John Wiley in 1969. When a significant drop-off in the rate of pressure drop increase for increasing flow of fluidization gas is measured, fluidization has occurred. Fluidization as used herein includes percolation or ebulation as those terms are understood in the art. The fluidization should be sufficient to elevate the particles initially without having them removed from the bed initially so that an internal circulation of the particle is created with the particles rising and falling due to proximity to the fluidizing gas. The bed of particles that are being fluidized would take on the properties of a fluid, or near fluid if they are merely being percolated. Preferred fluidization rates are from 2 to 10 times the minimum fluidization rate for the metal particles. Continuous operation could be possible with the fluidized bed reactor design by utilizing appropriate solid addition and withdrawal hardware.

The invention will be demonstrated in the following example:

EXAMPLE

A total of 253.4 grams of Fe powder could be loaded in a reactor with an inside diameter of 3.81 cm (1.5 inches). The resulting packed height would be 9 cm, which would yield a packing density of 2.48 gm/cc. The reactor could be made of Monel and could be heated with a clam shell heater.

Appropriate iron powder is produced electrolytically by SCM Metal Products, Inc. with a purity of 99.5%, the +150–325 mesh iron powder (Grade A-277) has an average particle size of approximately 100 microns. A preblended gas mixture with a nominal 1% $F_2$ in nitrogen could be used as the feed.

The iron powder bed would be fluidized under a flow of nitrogen and would be heated to 80° C. before switching to the $F_2$ feed. At the beginning, the feed flow would be started at 1,580 standard cubic centimeters (@21.1° C.) per minute (sccm) with a pressure drop across the bed (including a porous plate gas distributor) of 22 inches of water. As the reactor temperature would be raised, the feed flow would be reduced to maintain the pressure drop until the exit $F_2$ would be less than 1 ppm. At 250° C., almost complete conversion of $F_2$ would be expected and the feed flow would be at 784 sccm.

The same experiment could be repeated several times using the same batch of iron powder. At the end of the experiment, a significant bed expansion would be expected, suggesting a change in solid packing density due to the reaction. The bed expansion could be as high as 100% pending the degree of fluorination. The spent solids could be analyzed by X-ray diffraction and a majority of the original Fe would be expected to be in the form of $FeF_2$ and $FeF_3$ with minor amounts of Fe.

The most distinguishing feature of this invention is the use of a fluidized bed reactor with small particle size metal reactant particles for efficient reactivity. The fluidized bed allows uniform temperature inside the bed and prevents plugging due to metal "sintering" or powder generation. Very significant bed expansion could be noted after the reaction. This bed expansion would cause operating problems for a fixed bed reactor, but a fluidized bed can accommodate the bed expansion conveniently. In addition, a continuous addition and withdrawal of solids can be designed into the unit so that a continuous operation can be possible. Alternatively, several parallel connected switching beds can be used which are switched from on-line contact with the fluorine specie containing gas to off-line regeneration depending on the achievement of either a predetermined bed height due to bed expansion or a bed weight gain, preferably at least a 90% bed height expansion or bed weight gain, respectively.

Unlike packed beds, which have poor performance, the fluidized or percolated beds of the present invention showed good performance and efficient utilization of the iron particle reactant. That is because the latter reactor could be operated in a percolating or fluidized mode. In the reactor, the solid iron powder was percolated by the feed flow. The movement of the solids minimizes the potential of bed plugging and maintains uniform reactor temperature. Small particle size also contributes to improved performance by maximizing the capacity of the iron for reaction while minimizing the impact of iron fluoride passivation layers from forming on the iron particle and precluding further reaction and also by allowing for greater relative expansion of the particles, and therefore the bed, as the reaction proceeds.

The Fe powder can be fluidized easily at room temperature. At ambient conditions, the Fe powder bed started to fluidize at a minimum fluidization velocity of 1.6 cm/sec, which is reasonably close to the estimated value of 1.3 cm/sec. As temperature increases, the minimum fluidization velocity will decrease due to higher gas viscosity at higher temperatures.

At higher temperatures (>400° C.), even under nitrogen atmosphere, the Fe particles tend to agglomerate by sticking to each other. The phenomenon is known as "sintering", and it can occur at a temperature much below the melting point of the metal powder. Particle agglomeration will cause gas channeling through the bed and reduce the extent of gas-solid contact, unless a fluidized bed condition is utilized.

The large bed expansion is unexpected. That is one of the reasons why the iron powder cannot be conveniently used in a packed bed mode of operation. A fluidized bed reactor can deal with the bed expansion conveniently as long as suitable reactor volume is allocated for the anticipated expansion.

Minimum fluidization velocity is defined for a given particle size and density as the point at which there is a drop-off in increasing pressure drop as fluidization gas increases through a bed of the particles in question. During fluidization, there is little additional pressure drop as fluidization gas flow increases.

It is contemplated that switching beds could be used with one bed on feed, while the other beds are being recharged with fresh iron powder. Additionally, a single bed could be utilized for continuous service by utilizing a bed design where fresh iron powder is introduced through an inlet below the freeboard of the percolating or fluidized bed, and preferably near the base of the bed where the fluidizing or percolating gas is introduced, and a take-off effluent line is located above the level of the inlet, but below the level of the freeboard of the percolating or fluidized bed to remove reacted iron fluoride powder from the bed. The reacted iron fluoride is less dense than the fresh iron powder so that the effluent line would predominantly take off iron fluoride, rather than unreacted iron powder. Thus, a continuous process can be envisioned with either a single bed or two or more parallel beds.

A critical feature of the present invention is the metal powder particle size of essentially no greater than approximately 300 microns. For the purpose of the present invention, this means that up to 10 wt. % of the particles could have a larger particle size sufficient to provide enhanced mixing of the bed and to prevent caking of the smaller particles during fluidization. Particles of 500 to 2000 microns would be able to perform this function. Small particles are known to provide greater surface area, but at the cost of greater pressure drop through a bed of such smaller particles. The inventors have found that a passivating layer of metal fluoride forms on the iron particles, which deactivates them for reaction with the fluorine species. Even in the circumstance of passivation by metal fluoride, the particles of essentially no greater than approximately 300 microns would experience greater utilization than larger particles that become deactivated by passivation, leaving the relatively large interior of the large particle unreacted. Additionally, a desirable feature of the present invention is the use of bed expansion, as metal particles react to form metal fluoride, to determine on either a continuous basis or a batch basis when to replace a charge of metal particles. Small metal particles of essentially no greater than approximately 300 microns make this bed expansion property more pronounced due to their greater degree of reaction than would particles of larger size, which do not exhibit the extent of reaction, presumably due to surface passivation from metal fluoride formation.

The process of the present invention has a capacity to treat at least 700 liters of fluorine species per liter of iron particles. Iron powder, being much denser than previous recommended solids, such as $Al_2O_3$ or $Na_2CO_3$, will allow higher throughput before particle entrainment becomes a problem. The density is respectively 7.87 gm/cc, 4.0 gm/cc and 2.53 gm/cc for iron, $Al_2O_3$ and $Na_2CO_3$. Since the particle terminal velocity, i.e., the velocity that can entrain the particle, is proportional to its density of the solid, iron powder can tolerate higher gas velocity before entrainment becomes significant.

The present invention has been set forth with regard to several preferred embodiments. However the full scope of the invention should be ascertained from the claims which follow.

What is claimed is:

1. A process of destroying a fluorine specie selected from the group consisting of fluorine, chlorine trifluoride and mixtures thereof in a gas containing said fluorine specie and one or more gas components selected from the group consisting of $N_2$, $O_2$, Ar, He, $SiF_4$, $NF_3$, $CF_4$, $C_2F_6$, $CHF_3$, $SF_6$ and mixtures thereof by contacting said gas at a temperature in the range of 150 to 500° C. with at least one fluidized bed of metal particles, selected from the group consisting if iron, nickel, copper, calcium, magnesium, manganese, cobalt, tin and mixtures thereof, capable of reacting with said fluorine specie, said particles consisting essentially of particles having a particle size no greater than 300 microns, but wherein up to 10 wt. % of said bed of metal particles are large particles having a particle size sufficiently larger than 300 microns to assist in mixing of said bed of metal particles, said contacting selected from the group consisting of (a) alternately contacting said gas with one of a plurality of switching parallel connected fluidized beds of metal particles and switching beds when the height of the bed being contacted with said gas increases to a bed height corresponding to substantially stoichiometric reaction of said fluorine specie with said metal particles, and (b) continuously contacting said gas with a single fluidized bed where fresh metal particles are added to an inlet near a base of said fluidized bed and metal particles that have been reacted with said fluorine specie are removed above said inlet and below a freeboard of said fluidized bed.

2. A process of destroying a fluorine specie selected from the group consisting of fluorine, chlorine trifluoride and mixtures thereof in a gas containing said fluorine specie and one or more gas components selected from the group consisting of $N_2$, $O_2$, Ar, He, $SiF_4$, $NF_3$, $CF_4$, $C_2F_6$, $CHF_3$, $SF_6$ and mixtures thereof by alternately contacting said gas at a temperature in the range of 150 to 500° C. with one of a plurality of switching parallel connected fluidized beds of iron metal particles, capable of reacting with said fluorine specie, said particles consisting essentially of particles having a particle size no greater than 300 microns, but wherein up to 10 wt. % of said bed of iron metal particles are large particles having a particle size sufficiently larger than 300 microns to assist in mixing of said bed of iron metal particles, and switching beds when the height of the bed being contacted with said gas increases to a bed height corresponding to substantially stoichiometric reaction of said fluorine specie with said metal particles.

3. A process of destroying a fluorine specie selected from the group consisting of fluorine, chlorine trifluoride and mixtures thereof in a gas containing said fluorine specie and one or more gas components selected from the group consisting of $N_2$, $O_2$, Ar, He, $SiF_4$, $NF_3$, $CF_4$, $C_2F_6$, $CHF_3$, $SF_6$ and mixtures thereof by continuously contacting said gas at a temperature in the range of 150 to 500° C. with a fluidized bed of iron metal particles, capable of reacting with said fluorine specie, said particles consisting essentially of particles having a particle size no greater than 300 microns, but wherein up to 10 wt. % of said bed of iron metal particles are large particles having a particle size sufficiently larger than 300 microns to assist in mixing of said bed of iron metal particles, where fresh iron metal particles are added to an inlet near a base of said fluidized bed and metal particles that have been reacted with said fluorine specie are removed above said inlet and below a freeboard of said fluidized bed.

4. The process of claim 1 wherein said large particles have a particle size of 500 to 2000 microns.

5. The process of claim 1 wherein the gas contact is switched from a first of at least two switching parallel fluidized beds to another fluidized bed that has been recharged when the first bed has expanded by at least 90 percent of original bed height.

6. The process of claim 1 wherein after said contacting step said gas contains no greater than 1 parts per million by volume of said fluorine specie.

7. The process of claim 1 wherein said gas has a residence time in each fluidized bed of greater than 3 seconds.

8. The process of claim 1 wherein the flow of said gas is at least two times said minimum fluidization velocity.

9. The process of claim 3 wherein said iron metal particles are at least 99% iron by weight.

10. The process of claim 3 wherein said iron metal particles have an average particle size of 100 microns.

11. The process of claim 3 wherein said gas contains predominantly nitrogen and said fluorine specie.

12. The process of claim 3 wherein said large particles have a particle size of 500 to 2000 microns.

* * * * *